(12) United States Patent
Van Wageningen et al.

(10) Patent No.: US 7,675,910 B2
(45) Date of Patent: Mar. 9, 2010

(54) DISTRIBUTION OF STATUS INFORMATION FROM SEVERAL VIRTUAL OUTPUT QUEUS OVER A PLURALITY OF SWITCH CARDS OF A PACKET SWITCHING DEVICE

(75) Inventors: Andries Van Wageningen, Wijlre (NL); Hans Juergen Reumerman, Aachen (DE); Armand Lelkens, Klimmen (NL); Rainer Schoenen, Aachen (DE)

(73) Assignee: NXP B.V., Eindhoven (NL)

( * ) Notice: Subject to any disclaimer, the term of this patent is extended or adjusted under 35 U.S.C. 154(b) by 1268 days.

(21) Appl. No.: 10/480,130

(22) PCT Filed: Jun. 11, 2002

(86) PCT No.: PCT/IB02/02199

§ 371 (c)(1), (2), (4) Date: Dec. 9, 2003

(87) PCT Pub. No.: WO02/101985

PCT Pub. Date: Dec. 19, 2002

(65) Prior Publication Data

US 2004/0233922 A1 Nov. 25, 2004

(30) Foreign Application Priority Data

Jun. 13, 2001 (DE) ................................ 101286864

(51) Int. Cl.
*H04L 12/56* (2006.01)
*H04L 12/50* (2006.01)
*H04L 12/28* (2006.01)

(52) U.S. Cl. ........................ 370/389; 370/360; 370/412

(58) Field of Classification Search ................. 370/235, 370/236, 230, 395.1, 411, 412–418, 419, 370/392, 389, 395
See application file for complete search history.

(56) References Cited

U.S. PATENT DOCUMENTS

| 5,355,372 | A | 10/1994 | Sengupta et al. |
| 6,704,307 | B1 * | 3/2004 | Graves et al. ................ 370/372 |
| 7,058,063 | B1 * | 6/2006 | Cavendish ............ 370/395.41 |
| 7,133,399 | B1 * | 11/2006 | Brewer et al. ................ 370/360 |

(Continued)

FOREIGN PATENT DOCUMENTS

EP 1052816 11/2000

(Continued)

OTHER PUBLICATIONS

"Weighted Arbitration Algorithms with Priorities for Input Queued Switches with 100% Throughput" by R. Schoenen, G. Posts, G. Sander, Broadband Switching Symposium '99.

(Continued)

*Primary Examiner*—Hong Cho
*Assistant Examiner*—Hicham B Foud

(57) ABSTRACT

A packet switching device is disclosed. The packet switching device includes at least one line card with a port control for storage and arrangement of packets in output queues and for generating status information of the output queue, and at least one switch card consisting of a crosspoint matrix and an arbiter to control the crosspoint matrix. The port control distributes the status information over several arbiters. Each responding arbiter is provided to cyclically receive a respective part of the status information from the port control.

8 Claims, 1 Drawing Sheet

U.S. PATENT DOCUMENTS

Figure 1:
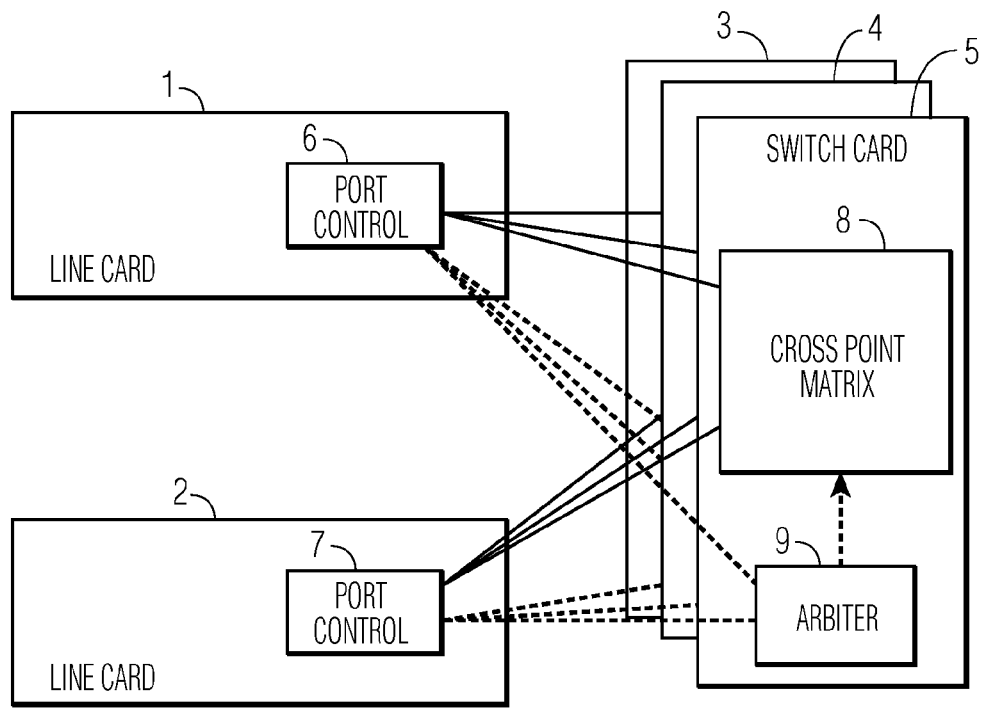

| | | | |
|---|---|---|---|
| 7,245,582 B1 * | 7/2007 | Roberts et al. | 370/217 |
| 7,522,527 B2 * | 4/2009 | Jun et al. | 370/236 |
| 2001/0023469 A1 * | 9/2001 | Jeong et al. | 710/241 |
| 2001/0028659 A1 * | 10/2001 | Johnson et al. | 370/413 |
| 2002/0141397 A1 * | 10/2002 | Piekarski et al. | 370/360 |
| 2002/0176431 A1 * | 11/2002 | Golla et al. | 370/412 |
| 2002/0181483 A1 * | 12/2002 | Oki et al. | 370/413 |
| 2003/0021266 A1 * | 1/2003 | Oki et al. | 370/388 |
| 2003/0128703 A1 * | 7/2003 | Zhao et al. | 370/392 |
| 2006/0285548 A1 * | 12/2006 | Hill et al. | 370/416 |

FOREIGN PATENT DOCUMENTS

| | | | |
|---|---|---|---|
| FR | 2549673 A1 | 1/1985 |
| FR | 2709222 | 2/1995 |
| JP | 6-70350 A | 3/1994 |
| JP | 6-350602 A | 12/1994 |
| WO | 99/40754 A1 | 8/1999 |

OTHER PUBLICATIONS

Badran, et al. "ATM Switch Architectures with Input-Output-Buffering: Effect of Input Traffic Correlation . . . " Computer Networks and ISDN Systems, vol. 26, Nr. 9, pp. 1187-1213.

English Translation of Notice of Reason for Rejection in JP patent appln. No. 2003-504596 (dated Dec. 15, 2006).

English Translation of Decision of Rejection in JP patent appln. No. 2003-504596 (dated Jul. 13, 2007).

* cited by examiner

DISTRIBUTION OF STATUS INFORMATION FROM SEVERAL VIRTUAL OUTPUT QUEUS OVER A PLURALITY OF SWITCH CARDS OF A PACKET SWITCHING DEVICE

The invention relates to a packet switching device comprising a plurality of switch cards.

The publication "Weighted Arbitration Algorithms with Priorities for Input Queued Switches with 100% Throughput" by R. Schoenen, G. Post, G. Sander, Broadband Switching Symposium '99, compares various weighted switching algorithms of a packet switching device. The switching algorithms attempt with various switching steps to prevent a collision of several packets intended for the same output port of the packet switching device and reduce the resulting data loss or delay. Use of status information on the output queues of data packets is not considered.

It is an object of the invention to guarantee collision-free switching of data in the form of packets.

The object is achieved by a packet switching device of the type described in the opening paragraph in that
  at least one line card is provided with a port control for storage and arrangement of packets in output queues and for generating status information of the output queue, and
  at least one switch card is provided consisting of a crosspoint matrix and an arbiter to control the crosspoint matrix, where the port control is provided to distribute the status information of several output queues over several arbiters and the arbiter of the switch card is provided to cyclically receive a respective part of the status information.

A packet switching device comprises several line cards and several switch cards. The line card includes as an essential component a port control. Each port control is connected with a plurality of parallel switch cards and its task is to arrange the incoming packets to the packet switching device by priority and desired output port of the packet switching device. The arrangement of the packets by priority and desired output port of the packet switching device in the port control is known as the virtual output queue (VOQ). The port control has information on the condition, known as status information, of the virtual output queue and sends this to the switch cards at regular intervals.

Each switch card consists of a crosspoint matrix and an arbiter. The configuration of the crosspoint matrix is redetermined at regular intervals by the arbiter and new links produced between the input and output ports of the packet switching device for switching the packets.

To calculate each link, the port control sends arbiter status information so that calculation can be optimized as a function of the status information.

The port control can send the new status information distributed via the arbiters. Each arbiter receives part of the status information from the port control. By receiving only part of the status information a maximum required bandwidth can be kept constant for exchange of information between the port control and an arbiter. The constant bandwidth between the port control and an arbiter is independent of the number of arbiters connected with the port control.

When distributing the status information the port control does not distinguish between the individual switch cards. Thus the number of switch cards has no effect on the functionality of the port control. Also the absence of one or more switch cards during operation has no effect on the function of the port control. The port control need not perform any additional functions if the packet switching device is supplemented with an additional switch card during operation.

The port control of a line card is connected at the same time with several parallel arbiters of the switch cards.

To ensure that in the event of a fault on a switch card, the function of the packet switching device is not disrupted too, the port control works independently of the number of switch cards provided a required switching capacity is maintained. By varying the number of switch cards, a throughput and delay of the switched packets can be influenced. By addition and removal, a scaling of the power of the packet switching device can be achieved without additional devices. A switch card can be operated both individually in a packet switching device and also—without additional changes in its function, speed, interface etc.—as one of many in a packet switching device.

If after a fault or addition the switch card is reclassified in operation, the arbiter of this switch card has no status information on the output queues. Nonetheless the arbiter calculates a configuration of its relevant crosspoint matrix and sends this to the port control and the crosspoint matrix. Each port control of the packet switching device receives the calculated (default) configuration and replies with the current (updated) status information. On the next calculation the arbiter takes into account the status information previously received.

Depending on the number of current changes of the status information the arbiter has therefore received, after the m-th calculation, most status information available, where m is equal approximately to the number of input and output ports of the packet switching device. The more redundant status information is sent from the port control to the arbiter, the faster the arbiter can work suitably again.

As each port control is simultaneously connected with several switch cards, it requires an interface which can be operated simultaneously with several switch cards. The internal operating speed of the port control is equal to n times the operating speed of a switch card, where n is equal to the number of line cards of the packet switching device.

An increase of operation speed by multiple use of the switch cards causes no change to the switch card or the speed of the links between the port control and the switch card. The switch card and the speed of the connections fulfil the requirements of a packet switching device with just one switch card, known as the minimal system.

A decision of the port control to use a particular switch card is triggered by the arbiter. The arbiter of each switch card at regular intervals transmits its calculated default configuration of the crosspoint matrix to the port control even if the calculation is based on incorrect and incomplete status information. The port control responds to the information from the arbiter. The port control does not distinguish each individual arbiter but considers all arbiters together as one arbiter and orientates itself to different frequencies with which a configuration was sent, and the physical connections to the arbiter.

By means of weighting, the port control can inform the arbiter whether and how urgently the packets in the input port should be switched. Weighting can be sent within the status information to the arbiter and consists of a function of all status information for an output port. Weighting can contain data on the priority and class of the packets or the waiting time and size of an output queue.

As the arbiter receives a copy of the weighting value received most recently, the receipt of a difference between the current value of the weighting and the value received most recently is sufficient. One condition is a complete value received most recently, which is absent in the case of a fault on the arbiter. For this reason a complete value representing all current status information is sent.

The invention also relates to a line card with a port control for storage and arrangement of packets in queues and to generate status information on the queues for a packet switching device with at least one switch card comprising a crosspoint matrix and an arbiter to control the crosspoint matrix. The port control distributes the status information to several arbiters, where each answering arbiter is designed for cyclic reception in each case of part of the status information from the port control.

The invention also relates to a switch card consisting of a crosspoint matrix and an arbiter to control the crosspoint matrix for a packet switching device with at least one line card with a port control for storage and arrangement of packets in output queues, and to generate status information of the queues. The port control distributes the status information to several arbiters where each answering arbiter is provided for cyclic reception in each case of part of the status information from the port control.

The invention will be further described with reference to an example of embodiment shown in the drawings, to which, however, the invention is not restricted. These show:

FIG. 1 a packet switching device and

Figure 2:
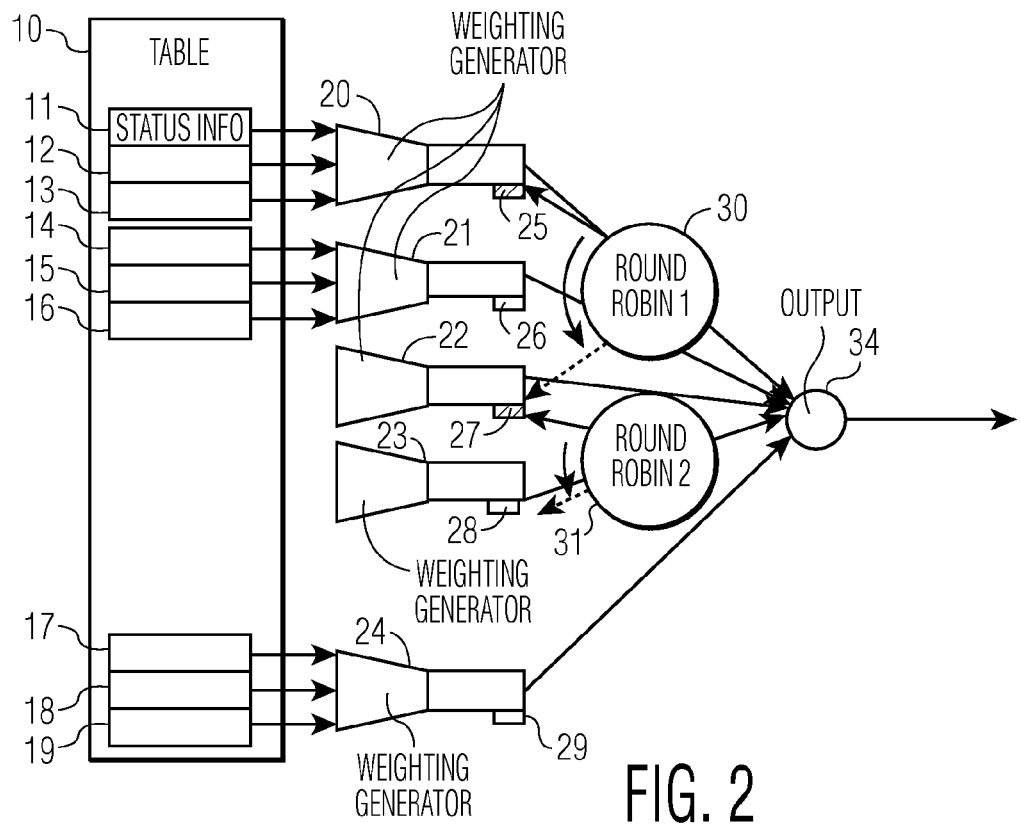

FIG. 2 administration of the status information within the port control.

A packet switching device shown in FIG. 1 consists of two line cards 1 and 2 and several switch cards 3 to 5. The line cards 1 and 2 each consist of different components not relevant for the description of the example of embodiment and therefore not shown, such as an optical transfer unit, frame generator, network processor etc., and a port control 6 and 7 essential for the example of embodiment. The number (n) of port controls is often much greater than two, in the example of embodiment it is restricted to two for clarity. Each switch card 3 to 5 consists of a crosspoint matrix 8 and an arbiter 9. Both the arbiter 9 and the crosspoint matrix 8 of each parallel switch card 3 to 5 are connected with the respective port control 6 and 7.

Data packets of constant length are known as cells. As cells of constant length are easier to process in switching than packets of varying size, the incoming packets are distributed within the line cards 1 and 2 into cells of constant length and stored temporarily in output queues. After successful switching i.e. accepted allocation of an input port with an output port, the cells are removed from the output queue.

The task of the port control 6 and 7 is to arrange the incoming cells in output queues by priority and desired output port of the packet switching devices. The arrangement is known as a virtual output queue (VOQ). Each port control 6 and 7 determines the status information of its respective output queue and transmits the status information to the arbiter 9 at regular intervals.

The arbiter 9 for each switch card 3 to 5 calculates at regular intervals known as cell periods an optimum configuration of the crosspoint matrix 8 for linking the input and output ports of the packet switching device. The calculations of the arbiters 9 are based on the status information from the port controls 6 and 7 in which the cells are waiting in output queues for switching to an output port. The links must fulfil two conditions. Within a cell period a link cannot connect several output ports with one input port and/or several input ports with one output port of the packet switching device. The arbiter 9 contains all current status information received from the port control 6 and 7 and in each cell period sends the calculated configuration of the crosspoint matrix 8 to the port control 6 and 7 and the crosspoint matrix 8.

As switch cards 3 to 5 are operated in parallel, an operating speed of each switch card 3 to 5 is less than the internal operating speed of the port controls 6 and 7. Thus the cell period of the switch cards 3 to 5 is longer than an internal cell period of the port control 1 and 2. As in each case the port control 6 and 7 is connected simultaneously with several switch cards 3 to 5, it requires an interface which can be operated simultaneously with several switch cards 3 to 5. The internal operating speed of port controls 6 and 7 is three times the operating speed of the switch card 3 to 5.

After receiving the configuration calculated by the arbiter 9 and hence the links, the port control knows to which switch card 3 to 5 it is connected in the next cell period.

FIG. 2 shows the administration of status information within the port controls 6 and 7. The port controls 6 and 7 each contain a table 10 with status information 11 to 19. Weighting generators 20 to 24 with a display 25 to 29 are also required to generate the weighting and indicate a change in weighting. A round robin 1 method 30 and a round robin 2 method 31 are used as scheduling strategies for access control at an output 34 to the arbiter 9.

In the table 10 are established all status information 11 to 19 and changes in status information 11 to 19 since the last dispatch to the arbiter. The weighting generator 20 to 24 generates the weighting which, using the round robin 1 method 30 as a scheduling strategy, receives access to an arbiter 9 through the output 34. In generating the weighting, only the last changed status information is taken into account. If no changed status information is present since the last cell period, the weighting determined by the round robin 2 method 31 is sent. In each cell period two weightings are simultaneously sent to the arbiter 9.

The higher the number of switch cards 3 to 5, the larger the amount of status information that each port control 6 and 7 sends to the arbiter 9. In order to keep the available bandwidth between the port control 6 and 7 and switch card 3 to 5 constant, each port control 6 and 7 distributes only part of the status information modified last to the arbiters 9 of the switch cards 3 to 5.

The invention claimed is:

1. A packet switching device comprising:
   multiple line cards, each line card with a port control for storage and arrangement of packets in output queues and for generating status information on the condition of the respective output queues, and
   multiple switch cards, each switch card consisting of a crosspoint matrix and an arbiter to control the respective crosspoint matrix, where the port control of each line card is provided to distribute the respective status information over the multiple arbiters and where each arbiter is provided to cyclically receive the status information from the port controls;
   wherein the status information includes a weighting that informs each arbiter whether and how urgently packets in respective output queues should be switched and wherein the weighting is provided to each arbiter as a difference between a current value of the weighting and a value of a most recently received weighting.

2. A packet switching device as claimed in claim 1, characterized in that at least one line card of the packet switching device is connected with several parallel switch cards.

3. A packet switching device as claimed in claim 1, characterized in that by removal and addition of the switch cards, a scaling of throughput and delay of switched packets within the packet switching device is provided.

4. A packet switching device as claimed in claim 1, characterized in that a plurality of redundant switch cards are provided as replacement for faulty switch cards.

5. A packet switching device as claimed in claim 1, characterized in that an internal operating speed of the port control has n times the value of an operating speed of a switch card, where n is equal to the number of line cards of the packet switching device.

6. A packet switching device as claimed in claim 1, characterized in that the arbiter of each switch card is provided to transmit at regular intervals to the crosspoint matrix of the respective switch card and to the port control of each line card a calculated configuration of the respective crosspoint matrix.

7. A line card comprising a port control for storage and arrangement of packets in output queues and to generate status information on the condition of the respective output queues for a packet switching device comprising at least one switch card consisting of a crosspoint matrix and an arbiter to control the crosspoint matrix, where the port control is provided to distribute the status information to several arbiters, and the arbiter is provided to cyclically receive the status information from the port control,
   wherein the status information includes a weighting that informs each arbiter whether and how urgently packets in the output queues should be switched and wherein the weighting is provided to each arbiter as a difference between a current value of the weighting and a value of a most recently received weighting.

8. A packet switching device comprising:
   multiple line cards, each line card with a port control for storage and arrangement of packets in output queues and for generating status information on the condition of the respective output queues, and
   multiple switch cards, each switch card consisting of a crosspoint matrix and an arbiter to control the respective crosspoint matrix,
   where the port controls are provided to distribute the respective status information over the multiple arbiters and each responding arbiter is provided to cyclically receive the status information from the port controls,
   characterized in that an internal operating speed of the respective port controls have n times the value of an operating speed of a switch card, where n is equal to the number of line cards of the packet switching device; and
   wherein the status information includes a weighting that informs each arbiter whether and how urgently packets in respective output queues should be switched and wherein the weighting is provided to each arbiter as a difference between a current value of the weighting and a value of a most recently received weighting.

* * * * *